US011775951B2

(12) United States Patent
Singh et al.

(10) Patent No.: US 11,775,951 B2
(45) Date of Patent: Oct. 3, 2023

(54) SCANNERPOS IN SELF-CHECKOUT (71) Applicant: NCR Corporation, Atlanta, GA (US)

(72) Inventors: Narinder Singh, Lawrenceville, GA (US); Gregory Scott Egan, Flowery Branch, GA (US); Steven Hassenzahl, Snellville, GA (US)

(73) Assignee: NCR Corporation, Atlanta, GA (US)

( * ) Notice: Subject to any disclaimer, the term of this patent is extended or adjusted under 35 U.S.C. 154(b) by 326 days.

(21) Appl. No.: 16/854,225

(22) Filed: Apr. 21, 2020

(65) Prior Publication Data
US 2021/0326821 A1 Oct. 21, 2021

(51) Int. Cl.
G06F 13/42 (2006.01)
G06Q 20/18 (2012.01)

(52) U.S. Cl.
CPC ......... *G06Q 20/18* (2013.01); *G06F 13/4282* (2013.01); *G06F 2213/0042* (2013.01)

(58) Field of Classification Search
CPC ................ G06Q 20/18; G06F 13/4282; G06F 2213/0042
See application file for complete search history.

(56) References Cited

U.S. PATENT DOCUMENTS

| 8,825,531 | B1* | 9/2014 | Catoe | G07G 1/0018 |
| | | | | 705/16 |
| 10,726,681 | B1* | 7/2020 | Durieux | G06Q 20/18 |
| 2003/0164979 | A1* | 9/2003 | Shimakawa | H04N 1/387 |
| | | | | 358/1.18 |
| 2007/0181679 | A1* | 8/2007 | Stoops | G07G 1/12 |
| | | | | 235/383 |
| 2012/0000976 | A1* | 1/2012 | Rollyson | G06Q 20/208 |
| | | | | 235/375 |
| 2013/0008959 | A1* | 1/2013 | Adamec | G01G 19/4144 |
| | | | | 235/383 |
| 2015/0221160 | A1* | 8/2015 | Graef | G07D 11/0096 |
| | | | | 235/379 |
| 2015/0254199 | A1* | 9/2015 | Sullivan | G06F 1/325 |
| | | | | 710/12 |
| 2018/0068291 | A1* | 3/2018 | Kakino | G06Q 20/18 |
| 2018/0121695 | A1* | 5/2018 | Ynclino, V | G06Q 20/20 |
| 2018/0137319 | A1* | 5/2018 | Giordano | G06K 7/1417 |

(Continued)

OTHER PUBLICATIONS

Benoit et al, Bypassing IOMMU Protection Against I/O Attacks, 2016, Seventh Latin-American Symposium on Dependable Computing, p. 148 & Figure 4 (Year: 2016).*

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

A SCO containing a single unified motherboard is generally described. The SCO includes a touchscreen display configured to provide a visible display for interaction with a user. The SCO also has a built-in scanning capabilities within the motherboard and connectors to connect to the display and other components of the SCO. The motherboard includes a multicore processor configured to control the scanning, the display and the other components. The scanning capability is configured to scan an item for a symbol, detect the presence of the symbol on the item, identify information on the symbol related to the item, and control the display to display an identity, price of the item, and print a receipt for a customer.

18 Claims, 4 Drawing Sheets (56) References Cited

U.S. PATENT DOCUMENTS

| | | | |
|---|---|---|---|
| 2019/0005481 A1* | 1/2019 | Singh | G06Q 20/208 |
| 2019/0228374 A1* | 7/2019 | Hicks | G06Q 20/204 |
| 2020/0052519 A1* | 2/2020 | Thompson | H02J 7/0071 |
| 2020/0057656 A1* | 2/2020 | Liu | G06F 9/4405 |
| 2021/0192486 A1* | 6/2021 | Uchimura | G07G 1/0045 |
| 2021/0232526 A1* | 7/2021 | Sultenfuss | G06F 13/4068 |

* cited by examiner

SCANNERPOS IN SELF-CHECKOUT

TECHNICAL FIELD

Embodiments pertain to ScannerPOS. Some embodiments relate to ScannerPOS used as a point of sale (POS) terminals. Some embodiments relate to ScannerPOS used with self-checkout (SCO).

BACKGROUND

The background description is for the purpose of generally presenting the context of the disclosure. Aspects of the description in this section that may not otherwise qualify as prior art at the time of filing is not admitted as prior art against the present disclosure. The information described in this section is thus provided to offer the skilled artisan a context for the following disclosed subject matter and should not be considered as admitted prior art.

The use of retail-related electronic devices, especially electronic assisted checkout and SCO, in stores has increased dramatically over the last decade. This trend has increased precipitously recently, both with the effort of businesses to cut costs by reducing headcount as well as the desire for individuals to interact less with retail store employees, assisted checkout and SCO have been introduced, in particular, in a variety of high use locations, such as grocery stores, gas stations and the like. Many of these checkout devices are stationary self-service terminals that are, in some cases, managed by store personnel. A checkout device includes not only various electronics, but also a scanner to read a bar code on an item presented at the scanner to provide the information to the electronics, as well as a display to provide information about the item being scanned. In some cases, the scanner may be, or include, a handheld scanner. The circuitry for the various components that form terminal a checkout device is complicated and individualized due to the variety of combinations of location of the components with respect to each other, e.g., local or remote, in the case of a handheld scanner.

SUMMARY

The present application describes in some embodiments a self-checkout (SCO) comprising: a touchscreen display configured to provide a visible display for interaction with a user; and a scanner comprising a motherboard and a plurality of connectors to connect to the display and a plurality of other components of the self-checkout device, the motherboard including a multicore processor configured to control the scanner, the display and the other components, the scanner configured to scan an item for a symbol, detect the presence of the symbol on the item, identify information on the symbol related to the item, and control the display to display an identity and price of the item.

In some embodiments, the processor comprises a central processing unit connected with a Platform Controller Hub (PCH) via a Direct Media Interface (DMI), the PCH connected with an input/output (I/O) interface via a Low Pin Count (LPC) bus.

In some embodiments, the scanner further comprises a plurality of cameras configured to take images through a plurality of windows.

In some embodiments, the processor controls the cameras to each provide images at a rate of a 30 frames per second, illumination for the images being synchronized among the cameras.

In some embodiments, the connectors comprise USB3 ports, and the processor controls the cameras through the USB3 ports and switch between supplying 5V and 24V to the cameras.

In some embodiments, the cores of the processor run an operating system, driver software to drive the components, a POS application, a universal OPOS or JAVA POS scanning software, and code decoding software to decode a code on the symbol once the symbol is detected, a multicore graphics processor being used to run code region finder software to determine where the symbol is located on the item.

In some embodiments, the processor is configured to detect the presence of the symbol on the item, identify information on the symbol related to the item, and control the display to display an identity and price of the item to no more than about 40 ms.

In some embodiments, the connectors comprise ports for a scale display, a speaker output and a Cash Drawer Kick Out (CDKO) port.

In some embodiments, the display is a dummy terminal that is controlled by the processor in the scanner and does not have a motherboard.

In some embodiments, the scanner contains the only motherboard in the self-checkout system.

In some embodiments, a method of operating a self-checkout (SCO) comprises: detecting the presence of an item; detecting the presence of a symbol on the item; determining an identity of the item based on the symbol; obtaining information of the item based on the identity, the information comprising a price of the item; controlling display of the identity and price of the item on a touchscreen display of the self-checkout device; and completing a transaction that comprises the item using the display.

In some embodiments, the method further comprises transmitting the identity of the item to a server; and receiving the information from the server in response to transmission of the identity of the item.

In some embodiments, the transmission to the server and reception from the server is WiFi-based.

In some embodiments, the method further comprises determining whether payment has been initiated on the touchscreen display after controlling display of the identity and price of the item on the touchscreen display.

In some embodiments, detecting the presence of the item and detecting the presence of the symbol on the item is based on images of the item and the symbol taken by a plurality of cameras of the self-checkout device.

In some embodiments, the method further comprises the scanner controlling the cameras to each provide images at a rate of a 30 frames per second, illumination for the images being synchronized among the cameras.

In some embodiments, the method further comprises the scanner controlling power to the cameras through USB3 ports and switching between supplying 5V and 24V to the cameras.

In some embodiments, the method further comprises operating multiple cores of a processor on a motherboard of the scanner to run an operating system, driver software to drive other components of the self-checkout device external to the scanning, a POS application, a universal OPOS or JAVA POS scanning software, and code decoding software to decode a code on the symbol once the symbol is detected, and operating multiple cores of a graphics processor to run code region finder software to determine where the symbol is located on the item.

In some embodiments, the method further comprises limiting detecting the presence of the symbol on the item, identifying information on the symbol related to the item, and controlling the display to display the identity and price of the item to no more than about 40 ms.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
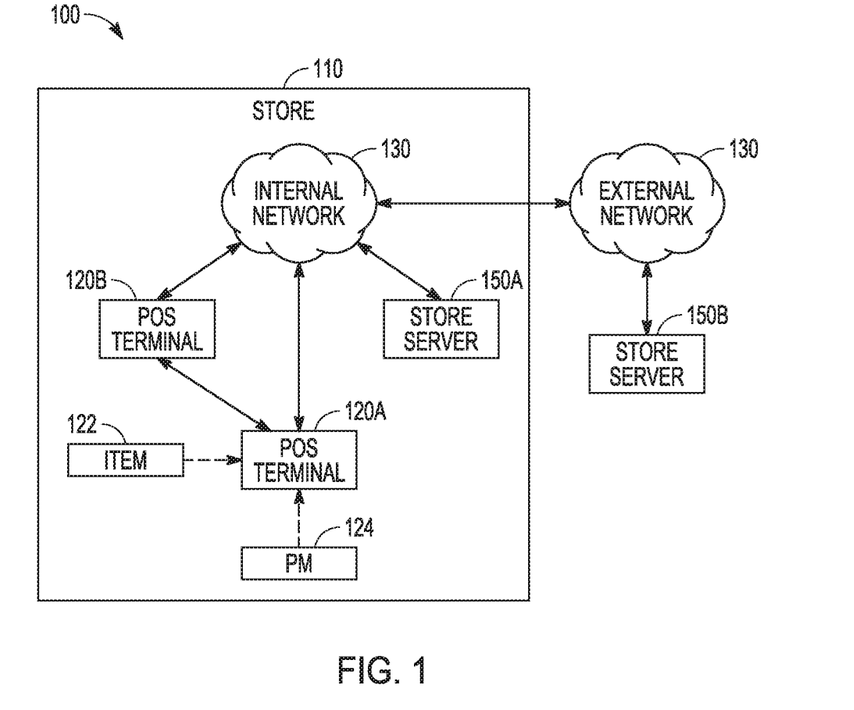
FIG. 1 illustrates one embodiment of a system according to one embodiment.
Figure 2A:
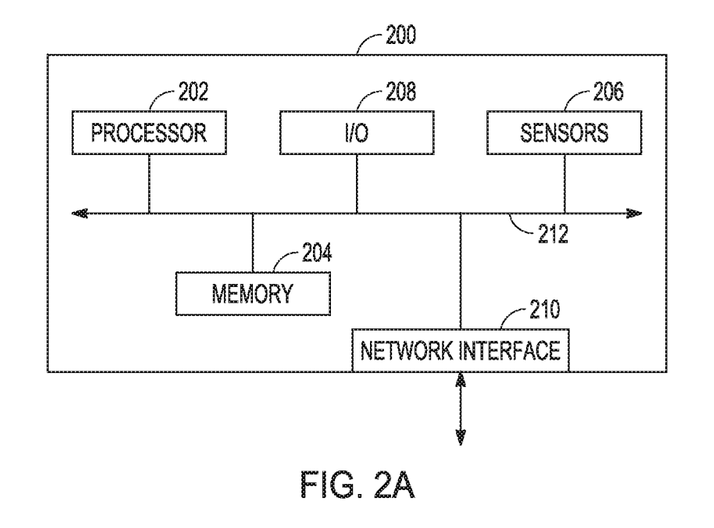
FIG. 2A illustrates a functional block diagram of a self-checkout device in accordance with an embodiment.

FIG. 1 illustrates a system 100 that includes one or more SCOs 120a, 120b. The system 100 may include a store 110 in which the SCOs 120a, 120b are disposed. The store 110 may be a bricks-and-mortar type store, providing goods and/or services such as a supermarket or department/specialty store, or an enterprise such as a gas station. The SCOs 120a, 120b may be configured to receive digital information, such as from a bar code of an item 122, and process the information in various ways, as described with reference to FIG. 2. The SCOs 120a, 120b may also be configured to receive financial transaction information from payment mechanism (PM) such as a mobile device or a financial card, such as a credit, debit, or gift card. The electronic financial transaction may be contactless, such as via near field communication (NFC) or optical character recognition (OCR), or may use a card reader or other mechanism to read a financial card. The SCOs 120a, 120b may thus obtain financial account-related information from an individual via one or more of a number of input mechanisms.

The SCOs 120a, 120b may be independent or may communicate with each other directly or via an internal network 130. The SCO 120a, 120b may match the item information (e.g., bar code) of an item 122 with pricing information. To match the information, the SCO 120a, 120b using data stored in a memory of the SCO 120a, 120b, or may communicate, e.g., via the internal network 130, with another entity (e.g., an in-store server) to obtain the data, which may then be displayed on a display of the SCO 120a, 120b.

The SCOs 120a, 120b may also communicate with other internal and external entities directly, via the internal network 130, or through an external network 140. The SCOs 120a, 120b may communicate, for example, via one or more micro, pico or nano base stations (BSs). The SCOs 120a, 120b may communicate with each other and external devices using any of a number of different techniques, such as WiFi, Bluetooth, Zigbee, or 3rd Generation Partnership Project (3GPP) network technologies, among others. In some cases, the SCO 120a, 120b may match the item information and pricing information with another entity— e.g., with an internal store server 150a via the internal network 130 and/or an external store server 150b via the external network 140. The SCOs 120a, 120b may in addition capture financial information related to a transaction and attempt to confirm the information by transmitting the captured financial information to one or more servers via at least one of the internal network 130 and one or more external networks 140.

In various embodiments, the networks 130, 140 may be wired or wireless networks and one or more of the networks 130, 140 may not be present. Other equipment, such as base stations, routers, access points, gateways and the like used in communicating through the networks 130, 140 are not shown for convenience. The external network 140 may be, for example, the internet or a private network.

FIG. 2A illustrates a functional block diagram of a SCO or other electronic device in accordance with an embodiment. The SCO 200 may operate as a standalone device or may be connected (e.g., networked) to other computers. The SCO 200 may include a physical device and/or a virtual device, such as a server running one or more virtual network functions (VNFs) of the network shown in FIG. 1.

The SCO 200 may include various components connected by a bus 212. The SCO 200 may include a hardware processor 202 such as one or more central processing units (CPUs) or other processing circuitry able to provide any of the functionality described herein when running instructions. The processor 202 may be a multicore processor that is provided on a motherboard. That is, the processor 202 may have multiple cores (separate processing units), which may be identical or different. The cores may or may not share memory, and may or may not communicate. Each core may independently execute a separate set of instructions, although the instructions may be the same or may be different. Each core may thus be used to provide functionality that is the same as, or different from, another core. For example, one or more of the cores may be used to handle network communications, one or more of the cores may be used to handle graphics for the display 224, and one or more of the cores may be used to process images from the camera, among others.

The processor 202 may be connected to a memory 204 may include a non-transitory machine-readable medium on which is stored one or more sets of instructions. The memory 204 may include one or more of static or dynamic storage, or removable or non-removable storage, for example. A machine-readable medium may include any medium that is capable of storing, encoding, or carrying instructions for execution by the processor 202. Examples of a non-transitory machine-readable medium include solid-state memories, magnetic media, and optical media. Non-transitory machine-readable medium may include, for example, Electrically Programmable Read-Only Memory (EPROM), Random Access Memory (RAM), or flash memory.

The instructions may enable the SCO 200 to operate in any manner thus programmed, such as the functionality described specifically herein, when the processor 202 executes the instructions. The machine-readable medium may be stored as a single medium or in multiple media, in a centralized or distributed manner. In some embodiments, instructions may further be transmitted or received over a communications network via a network interface 210 utilizing any one of a number of transfer protocols (e.g., frame relay, internet protocol (IP), transmission control protocol (TCP), user datagram protocol (UDP), hypertext transfer protocol (HTTP), etc.).

The network interface 210 may thus enable the SCO 200 to communicate data and control information with other devices via wired or wireless communication. The network interface 210 may include electronic components such as a transceiver that enables serial or parallel communication. The wireless connections may use one or more protocols, including Institute of Electrical and Electronics Engineers (IEEE) Wi-Fi 802.11, Long Term Evolution (LTE), 4G, 4G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which the communication device 200 may be connected via the network interface 210 may include a local area network (LAN), a wide area network (WAN), a packet data network (e.g., the Internet), mobile telephone networks (e.g., cellular networks), and wireless data networks. The SCO 200 may be connected to the networks via one or more wired connectors, such as a universal serial bus (USB), and/or one or more wireless connections, and physical jacks (e.g., Ethernet, coaxial, or phone jacks) or antennas.

The SCO 200 may further include one or more sensors 206, such as one or more of an accelerometer, a gyroscope, a global positioning system (GPS) sensor, a thermometer, a proximity sensor, and an ambient light sensor, among others. The sensors 206 may include some, all, or none of one or more of the types of sensors above (although other types of sensors may also be present), as well as one or more sensors of each type.

The SCO 200 may further include one or more input/output (I/O) devices 208. The I/O devices 208 may include one or more of a display, a camera, an alphanumeric input device 212 (e.g., a keyboard), a keyboard, a microphone, a mouse (or other navigation device), a weight sensor, or a fingerprint scanner, among others. The I/O devices 208 may include some, all, or none of one or more of the types of I/O devices above (although other types of I/O devices may also be present), as well as one or more I/O devices of each type.

Figure 2B:
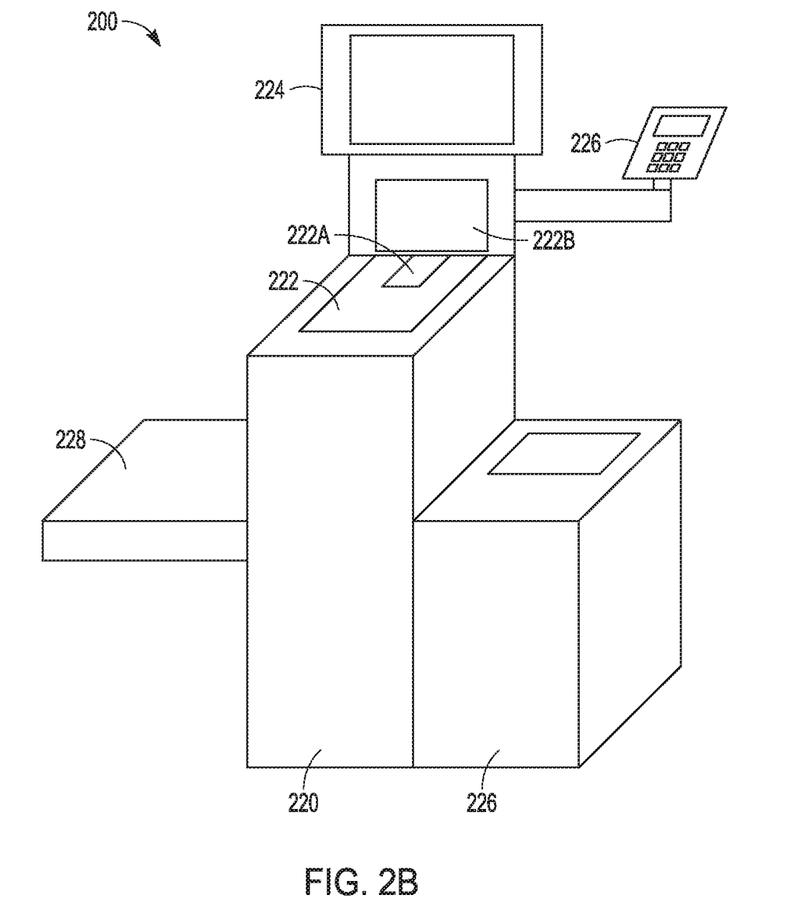
FIG. 2B illustrates physical aspects of the self-checkout device of FIG. 2A in accordance with an embodiment.

FIG. 2B illustrates physical aspects of the SCO 200 of FIG. 2A in accordance with an embodiment. The SCO 200 may, in general, have a scanner POS and an operator display, in which the scanner POS integrates a standalone bioptic scanner and electronics. The SCO 200 may include a main section 220, a secondary section 226, and a tertiary portion 228 to retain a group of items thereon. The main section 220 may include a scanner 222 having two (glass) windows 222a, 222b that is insertable into (i.e., removable or separable from) a chassis of the main section 220. The main section 220 may also include a display 224 and pinpad 226 connected with the display 224. The main section 220 may also have a bin in which cash is retained, as well as a reception area to receive cash (bills and change) from a user, and a dispenser to dispense change (bills and change) to the user. The processor may be disposed in the main section 220 and may handle all aspects of processing by the SCO 200, including those related to item scanning (detection and identification of an item), internal communication with various components of the main section 220 and external communication with other elements (e.g., the internal or external store server) external to the main section 220, controlling the display 224, and controlling communications of the pinpad 226, among others.

The scanner 222 may contain a motherboard on which one or more processors is mounted. An item may be scanned using the scanner 222 by placing the item within the vicinity of one of the windows 222a, 222b. One or more lasers (or other illumination source) contained within the main section 220 may be used to illuminate a one-dimensional predetermined symbol, such as a bar code, or a two-dimensional predetermined symbol, such as a quick response (QR) code or data matrix. The image may be detected by optical sensors contained within one or more cameras in the main section 220. The cameras may be embedded in the scanner 222 and/or can be disposed at outside of the scanner 222, at a maximum distance of about 12 feet for accurate capture and timing for processing of the image captured. In some embodiments, each camera may be associated with a different illumination source.

The laser and/or camera field of view may be directed by one or more mirrors within the main section 220 to permit scanning of the item at various orientations through any of the windows 222a, 222b. That is, an image of the predetermined signal may be captured using the mirrors to direct the image so that it impinges on optical sensors in the main section 220.

Each camera may provide an image at a rate of about 30 frames per second (fps). Thus, in embodiments in which 3 cameras are used to provide images, the total frame rate is about 90 fps. Such a rate is fast enough to allow sufficient time for processing each image to determine whether an item is present, as well processing the symbol if present, while not unduly limiting manual/physical processing of the item and stalling. The processor in the main section 220 may determine whether a symbol is present in an image by, for example, matching at least a portion of a symbol captured by one or more of the cameras to that stored in memory.

Having determined that the desired symbol is present, the processor may then determine information of the symbol. The processor may determine from one or more areas of interest within the symbol (e.g., lines of the bar code, two-dimensional areas within the entire area of the QR code) a number and/or size of objects within each area, and/or distance between each object. The information of the symbol may be matched by the processor in a lookup table in a memory within the main section 220 to determine the item scanned. Another lookup table may be used to match the item with store-related specifics of the item, such as price, to supply to the display 224. The processor may also keep track of the total cost of all items scanned, which may also be provided to the display 224 via the processor. Alternatively, or in addition, the processor may communicate with the internal store server and/or external store server to obtain the store-related specifics of the item. The internal store server and/or external store server may also contain other information about the item that may be unused by (and thus not transmitted to) the SCO 200, such as quantity available/remaining in the store, wholesale cost to the store, among others.

The display 224 may provide a display only (i.e., output only) or may be an I/O device (e.g., a touchscreen), whose user input is provided to the processor for processing. The selectable (visible) information (e.g., icons) on the display 224 may include, for example, payment options, ability to cancel an item or order, ability to provide of a code for an item (e.g., a bulk item without a symbol being weighed using a scale attached to the scanner 220 disposed within the main section 220), ability to select payment options, etc..... The input from the display 224 provided by the user may be, for example, selection of payment options, cancellation of an item/order, manual entry of a bulk item code, among others. In either case, the display 224 may be entirely under the control of the processor rather than a motherboard in the display 224 controlling the display 224 and various components of the SCO 200 other than the scanner 220. In some cases, however, the display 224 may have minimal processing power that is limited to enabling display of the desired information indicated by the processor (e.g., a video card) or even may not have its own processor. The processor may also control communications with the pinpad 226 for taking payment for purchase of the items.

The secondary section 226 may include a scale or other weight sensor to determine whether an item scanned using the scanner 222 has been placed on the secondary section 226 (e.g., on the secondary section 226 within a bag adjacent to the secondary section 226). The scale in the secondary section 226 may be connected to the processor in the main section 220, for example, to determine whether the weight of the item placed on the secondary section 226 matches that determined when scanned by the main section 220.

Figure 2C:
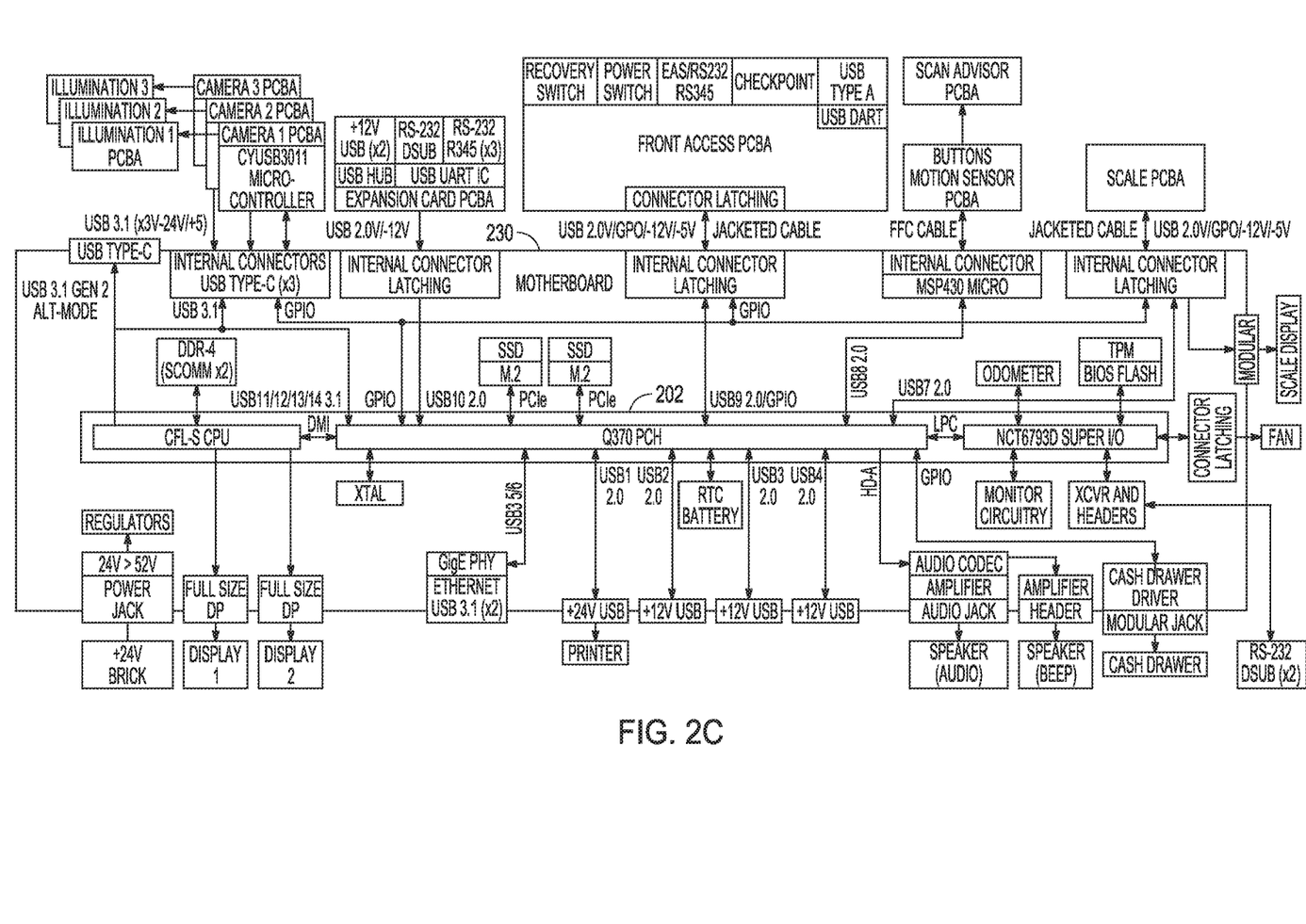
FIG. 2C illustrates a motherboard in accordance with an embodiment.

As indicated above, the processor and other components used to operate the various components of the SCO 200 may be integrated on a single motherboard within the scanner 222. FIG. 2C illustrates a motherboard 230 in accordance with an embodiment. Such an embodiment avoids complicated implementations in which a processor is contained in both the display 224 and the scanner 222, with the processor in the display 224 being a master processor and the processor 202 in the scanner 222 being a slave processor. The display 224 may thus be a dummy terminal, in which other than no processing is provided—other than perhaps a processor on a graphics card to provide processing for graphics on the display 224. Alternatively, the display 224 may act like a dummy terminal, having a processor able to control other aspects of the SCO 200 (i.e., more than merely the display 224—such as control of the scanner 220), but one that is not configured to operate to control these other aspects. The use of a single motherboard (containing a multicore processor) may, however, combine all self-checkout operations, permitting easy upgrade of the processing capabilities by replacement of a single element—the scanner 222, in addition to elimination of the use of a separate processor in the display 224, thereby reducing the overall cost of the SCO 200 by reducing the cost and complexity of the display 224 as well as the logistics for servicing the SCO 200 by reducing the number of parts (which may be retained in different physical locations).

The processor 202 on the motherboard 230 may operate on a selected hardware platform, such as X86 or advance RISC machine (ARM) and may be software agnostic, depending on the desired hardware platform. For example, the processor may operate using a proprietary operating system, such as Windows, or an (at least partially) open source operating system such as Linux or Android. The camera interface may be selected from a Mobile Industry Processor Interface (MIPI) or universal serial bus (USB), among others. The motherboard may multiple connectors of various types to connect to individual external components, which may include multiple printed circuit board arrays (PCBAs) of the SCO 200. For example, the connectors at the back of the scanner may include one or more of each of: ethernet ports, RS232 ports, display (e.g., VGA) ports, 5V USB 3.1, USB type-C, 12V USB power, USBC and/or 24V USB power ports, in addition to a port for a scale display, power, speaker output, and a Cash Drawer Kick Out (CDKO) port. These ports may be used to connect the motherboard to the cameras, an expansion card PBCA that contains a USB hub and RS-232 connectors, a motion sensor (which may be connected to a scan advisor PCBA operating the scanner), a scale, a printer, one or more displays, one or more speakers, and a cash drawer. The motherboard may use latching to the PCBAs to synchronize communications between the external components, and perhaps provide clock signals and/or power to these components. The USBC Superspeed may be used for communication with the cameras, and for a high-speed data link, as operation of the cameras may be in the near megabit range due to the timing aspects from image capture to item identification and display to maintain a reliable checkout pace in the checkout line (e.g., pace set by a cashier using the SCO 200). In some embodiments, the image recognition and item identification may be limited to no more than about 40 ms to enable adequate advancement of items when being scanned at a checkout counter. When this value exceeds 40 ms, it may be unable to maintain an acceptable checkout speed. This, in turn, may limit the frame rate of the cameras, as well as distance of the cameras from the processor and motherboard in the scanner.

The Basic Input/Output System (BIOS) instructions used by the processor may configure the USBS ports for improved camera latency over standard OS control. The processor may also be used to control power to the USB3 cameras 5V/24V. The processor 202 may include a multicore processor connected with a Platform Controller Hub (PCH) via a Direct Media Interface (DMI), which is connected with an I/O interface via a Low Pin Count (LPC) bus.

Each camera may contain a direct memory access (DMA) controller, which communicate with the motherboard 230 through the USB type C connector. The illumination used to detect the symbol on the item on the scanner may be powered through the USB type C connector and controlled by the DMA controller. The processor 202 may sync all signals to the cameras using a control switch in multiples switch banks on the motherboard 230, each switch bank dedicated to a different camera. The control switches may be control synchronously to link the cameras together when activated. Each control switch may be provided from a general-purpose input/output (GPIO) of the processor 202. Each switch bank may also have a switch used to supply 5V or a 24V for power to the associated camera.

The use of the processor 202 on the motherboard 230 may permit reliable interactions among the components of the SCO 200 by centralizing load balancing among the components. That is, the resources used for image capture and recognition, electronic communication, item and price identification, display, printing and CDKO, among others, may be balanced by the processor 202 without locking up the entire system. To this extent, in some embodiments, the processor 202 may include a main processor whose cores may operate, in addition to the OS and driver software to drive the various components, a POS application, a universal POS (UPOS) or JAVA POS scanning software, and code decoding software to decode the code (e.g., barcode, QR code) on the symbol once the symbol is detected. A multicore graphics processor may be used to operate code region finder software to determine where the symbol is located on the item.

Figure 3:
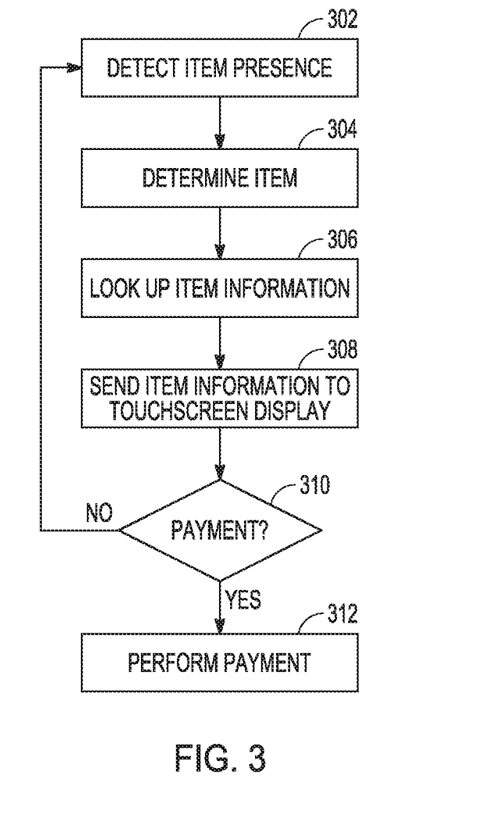
FIG. 3 illustrates a flowchart of a method of using a self-checkout device in accordance with some embodiments.

FIG. 3 illustrates a flowchart of a method of using a SCO in accordance with some embodiments. Although some steps are shown, the embodiment illustrated is not meant to be exclusive; additional steps are contemplated, such as communication with various entities internal and/or external to the SCO. At step 302, the processor in the motherboard of the scanner may determine that an item is present at the scanner. To accomplish this, the processor may receive data of images from a plurality of frames from a plurality of cameras in the scanner at a rate of about 90 fps. The images may be captured through multiple windows in a top portion and perhaps a side portion of an extended portion of the scanner that extends from one side of the scanner.

At step 304, the processor may identify a symbol/shape or region of a symbol. The symbol may be a one-dimensional symbol, such as a bar code, or a two-dimensional symbol, such as a QR code. The processor may identify the item from the information contained in the symbol or region that corresponds to the item using a lookup table in a memory on the motherboard.

At step 306, the processor may determine the price of the item, among other information. The processor may determine the price using the lookup table in a memory on the motherboard or may communicate with a server to obtain the information. Communication with the server may be relatively short-range communication, e.g., WiFi/based on IEEE 802.11 protocols. The server may be within the store or may be external to the store (e.g., on the cloud). The price information may be specific to the store brand (e.g., Whole Foods, Walmart) and may further be specific to the particular store (e.g., the particular location). The use of a server external to the SCO allows the pricing information to be updated in a centralized location, with the SCO calling out to the server when the item is identified, rather than having to constantly update multiple SCOs when pricing changes are made.

At step 306, the processor may send the item identification and price information (e.g., price, original price and savings if on sale, etc. . . . ), among others, to the touchscreen display. The display may have a VGA card controlled by the processor and may in response to reception of the information provide a visible display and perhaps an accompanying audible description of the information displayed about the item.

At operation 310, the processor may determine whether a payment key or entry of a payment mechanism (e.g., insertion of a credit/debit card into a keypad, use of NFC or remote payment) has been initiated. If not, the processor may return to step 302 and wait for the presence of another item to be detected. In some embodiments, if the item scanned has not been placed into a particular area of the SCO within a predetermined time period, a visible or audible alert may indicate this to the SCO user (and/or manager). In some embodiments, if another item has not been detected within a predetermined time, and payment has not been received, a visible or audible alert may prompt scanning of an additional item, a request to enter for more time, or initiation of payment to the SCO user (and/or manager).

At operation 312, after payment has been initiated, the SCO may receive the payment information and transmit the relevant customer and cost to an offline payment server. The payment server may be, for example, an intermediary, such as a credit card server, or may be a server that retains resources of the purchaser, such as a bank server. The SCO may also activate the CDKO, depending on the method of payment (e.g., cash, check) or to give change or a cash advance. The SCO may print the item information using a printer on the SCO (which is also controlled by the motherboard) and/or may send to a user account the purchase information of all of the items via electronic transmission.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The abstract will allow the reader to quickly ascertain the nature of the technical disclosure. The abstract is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects have more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. A self-checkout (SCO) comprising:
a touchscreen display configured to provide a visible display for interaction with a user; and
a scanner comprising a motherboard and a plurality of connectors to connect to the display and a plurality of other components of the SCO, the motherboard including a multicore processor configured to control the scanner, the display and the other components, the scanner configured to scan an item for a symbol, the symbol being a bar code or quick response (QR) code, detect the presence of the symbol on the item, identify information on the symbol related to the item, and control the display to display an identity and price of the item, the display being a dummy terminal that does not have a motherboard and is controlled by the multicore processor, the multicore processor of the scanner centralizing load balancing among resources used for image capture and recognition, electronic communication, item and price identification, display, printing and Cash Drawer Kick Out (CDKO),
wherein the multicore processor is configured to provide, within a predetermined time, a prompt to request more time in response to another item not being detected and payment not being received.

2. The SCO of claim 1, wherein the processor comprises a central processing unit connected with a Platform Controller Hub (PCH) via a Direct Media Interface (DMI), the PCH connected with an input/output (I/O) interface via a Low Pin Count (LPC) bus.

3. The SCO of claim 1, wherein the scanner further comprises a plurality of cameras configured to take images through a plurality of windows.

4. The SCO of claim 3, wherein the processor controls the cameras to each provide images at a rate of a 30 frames per second, illumination for the images being synchronized among the cameras.

5. The SCO of claim 3, wherein the connectors comprise USB3 ports, and the processor controls the cameras through the USB3 ports and switch between supplying 5V and 24V to the cameras.

6. The SCO of claim 1, wherein the cores of the processor run an operating system, driver software to drive the components, a POS application, a universal OPOS or JAVA point of sale (POS) scanning software, and code decoding software to decode a code on the symbol once the symbol is detected, a multicore graphics processor being used to run code region finder software to determine where the symbol is located on the item.

7. The SCO of claim 1, wherein the processor is configured to detect the presence of the symbol on the item, identify information on the symbol related to the item, and control the display to display an identity and price of the item to no more than 40 ms.

8. The SCO of claim 1, wherein the connectors comprise ports for a scale display, a speaker output and a Cash Drawer Kick Out (CDKO) port.

9. The SCO of claim 1, wherein scanning and point of sale functionality are built into the motherboard.

10. A method of operating a self-checkout (SCO), the method comprising scanning functionality of the SCO:
detecting, by a scanner, the presence of an item;
detecting, by the scanner, the presence of a symbol on the item, the symbol being a bar code or quick response (QR) code;
determining, by the scanner, an identity of the item based on the symbol;
obtaining, by the scanner, information of the item based on the identity, the information comprising a price of the item;
controlling, by the scanner at a display, display of the identity and price of the item on a touchscreen display of the SCO, the display being a dummy terminal that does not have a motherboard and is controlled by a multicore processor;
centralizing load balancing, by the scanner, among resources used for image capture and recognition, electronic communication, item and price identification, display, printing and Cash Drawer Kick Out (CDKO); and
providing, by the scanner and within a predetermined time, a prompt to request more time in response to another item not being detected and payment not being received.

11. The method of claim 10, further comprising:
transmitting, by the scanner, the identity of the item to a server; and
receiving, by the scanner, the information from the server in response to transmission of the identity of the item.

12. The method of claim 11, wherein:
the transmission to the server and reception from the server is WiFi-based.

13. The method of claim 10, further comprising:
determining, by the scanner, whether payment has been initiated on the touchscreen display after controlling display of the identity and price of the item on the touchscreen display.

14. The method of claim 10, wherein detecting the presence of the item and detecting the presence of the symbol on the item is based on images of the item and the symbol taken by a plurality of cameras of the SCO.

15. The method of claim 14, further comprising the scanner controlling the cameras to each provide images at a rate of a 30 frames per second, illumination for the images being synchronized among the cameras.

16. The method of claim 14, further comprising the scanner controlling power to the cameras through USB3 ports and switching between supplying 5V and 24V to the cameras.

17. The method of claim 10, further comprising operating, on and by the scanner, multiple cores of a processor on a motherboard that performs the scanning and run an operating system, driver software to drive other components of the SCO external to the motherboard, a POS application, a universal OPOS or JAVA POS scanning software, and code decoding software to decode a code on the symbol once the symbol is detected, and operating multiple cores of a graphics processor to run code region finder software to determine where the symbol is located on the item.

18. The method of claim 10, further comprising limiting, by the scanner, detecting the presence of a barcode on the item, extracting the barcode from the scanning, decoding the barcode to find the price of the item within 40 ms, controlling the display to display the identity, and controlling a printer of the SCO to print a receipt.

* * * * *